Oct. 28, 1969  G. J. SANTRY  3,475,265

LIGHTWEIGHT MOLD FOR THE FORMING OF CONCRETE

Filed Feb. 28, 1966

INVENTOR.
GEORGE J. SANTRY
BY
H. T. Seryan & D.T. Kalil
ATTORNEYS

United States Patent Office 3,475,265
Patented Oct. 28, 1969

3,475,265
LIGHTWEIGHT MOLD FOR THE FORMING OF CONCRETE
George J. Santry, New Canaan, Conn., assignor, by mesne assignments, to Schokbeton Products Corp., a corporation of New York
Filed Feb. 28, 1966, Ser. No. 530,619
Int. Cl. B32b 5/16, 19/02, 27/20
U.S. Cl. 161—160                              8 Claims

ABSTRACT OF THE DISCLOSURE

This invention relates to a lightweight mold for the forming of concrete comprising a thin, smooth, substantially water impervious concrete receiving gel-coat layer of a polymerized epoxy or polyester resin bonded to a massive mold core portion containing 25 to 90% by weight of expanded lightweight aggregate in a hardened thermosetting resin matrix. The gel-coat layer may be provided with fiber glass reinforcement, and the hardened thermosetting resin matrix of the massive mold core may be modified by the addition of thermoplastic resins, elastomers and plasticizers and may also contain up to 60% by weight of filler material.

---

Figure 1:
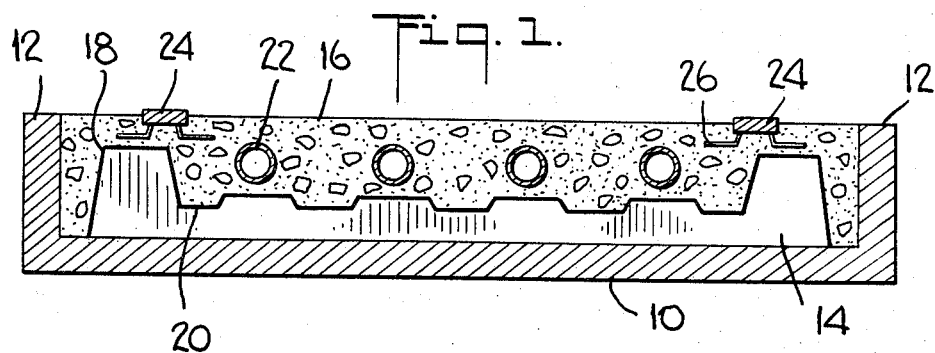

The present invention relates to molds for the forming of structural shapes and, more particularly, to molds for the forming of concrete and other cementitious articles and structural components.

It is well known that the concrete-forming art has endeavored to provide the building and construction industry with molds which (a) maintain dimensional integrity even after repeated pourings, (b) have high compressive strength together with good flexural rigidity yet are light in weight and (c) are relatively simple to make with a minimum of skilled labor. However, prior art efforts to produce such a mold have not been too fruitful. For example, the common wood molds require a great deal of skilled and semi-skilled labor for their preparation. In addition, the wood molds have a tendency to warp and lack the requisite rigidity. Attempts to stiffen such molds with reinforcements merely raise the costs of production and detrimentally increase the weight of the molds.

Portland cement, concrete and steel molds, even though they have the strength needed for concrete-forming are much too heavy and cumbersome particularly for those prevalent applications requiring on-site production of structural articles or components out of concrete.

Schmocker in U.S. Patent No. 3,153,835 discloses plywood-reinforced fiber glass forms or molds which are said to overcome some of the disadvantages attributable to the prior art wood, portland cement, concrete and steel molds. For instance, the Schmocker forms would be lighter than the cement, concrete and steel molds and should be somewhat more rigid and durable than a plain wood mold. However, the preparation of these plywood-reinforced molds is a time-consuming, rather exacting process necessitating the use of skilled personnel. Thus, as far as I am aware, the prior art has not been able to provide the building and construction industry with concrete-forming molds having a proper balance of strength and durability on the one hand and weight and cost of production on the other hand.

It has now been discovered that unique concrete-forming molds having good durability, dimensional stability and high strentgh may now be economically produced from a lightweight composition containing special ingredients in novel proportions.

It is an object of the present invention to provide a relatively inexpensive, lightweight mold for use in the forming of concrete.

A further object of this invention is to provide a concrete-forming mold having good durability and high strength together with dimensional stability.

Another object of the invention contemplates the provision of a lightweight, concrete-forming mold having high compressive strength and flexural rigidity which mold is relatively simple to produce with the use of unskilled labor.

Still another object of the present invention is to provide a lightweight composition especially adapted for use in the body portion of a concrete-forming mold.

The invention further contemplates the provision of a composite concrete-forming mold which is light in weight yet durable.

Figure 2:
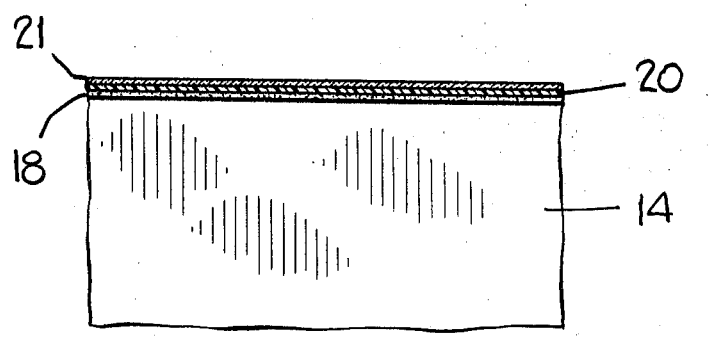

Other objects and advantages will become apparent from the following description taken in conjunction with the acompanying drawing in which:

FIGURE 1 is a transverse section of a concrete-forming mold within the scope of the present invention; and FIGURE 2 shows an enlarged section of a portion of the mold depicted in FIGURE 1.

Broadly stated, the present invention contemplates novel concrete-forming molds which are light in weight and which comprise a special combination of parts and ingredients in unique relationship with each other. In general, the concrete-forming molds of this invention are composite and comprise at least two separate portions, i.e., a concrete-receiving lamina and a core or body portion, bonded together with a special binder material having good strength as well as excellent adhesiveness. The concrete-receiving lamina is made of a polymerized plastic compound selected from the group consisting of epoxy and polyester resins mixed with a suitable hardener. This compound is incorporated into the mold as a relatively thin, e.g., 10 to 50 mils, water-impervious gel-coat having a smooth surface. It is bonded to a massive core portion containing, by weight, 10% to 20% of a hardened thermosetting resin binder which may be modified with thermoplastic resins, elastomers, plasticizers and combinations thereof. In addition, the core also includes up to 60%, e.g., 50%, of a filler material and 25% to 90% of an expanded, lightweight aggregate weighing between 20 and 60 pounds per cubic foot (lb./cu. ft.) which makes up the balance of the mold composition.

Where additional strength is a criterion, the core portion contains, by weight, 30% to 60% of the filler material. In such a case, the lightweight aggregate is present in amounts of at least 25% but not more than 60%. In the same connection, it is also within the scope of the invention to provide a stratified core portion comprising one or more layers containing 10% to 20% of the binder with the balance being the lightweight aggregate alternately adjacent and bonded to one or more other layers containing 10% to 20% of the binder, 30% to 60% of the filler with the balance being the lightweight aggregate in amounts of between 25% and 60%.

The gel-coat is advantageously an epoxy resin, i.e., a synthetic resin usually produced by a condensation reaction between epichlorohydrin and bisphenol-A in a caustic media. However, epoxies can also be produced by reacting an olefin with peracetic acid. As is well known in the art, the epoxies usually require a hardener to initiate setting. Among the hardeners used are the aliphatic and polyhydric alcohols. By varying the proportions of the reactants and the hardener it is possible to vary the molecular weight of the final product over a rather wide range, e.g., 4000 to 8000. However, for the purposes of this invention, it is advantageous to have the hardener content vary from 10% to 25% by weight of the reactants. The epoxies are generally more suitable for this invention since they have better strength and greater flexibility than do the polyester resins which are often catalyzed with methyl ethyl ketone peroxide.

The core portions of the mold are composed of a careful balance of selected ingredients each of which contributes to the novel characteristics of the molds within the contemplation of this invention. For example, if too much polymerized resin is used, e.g., more than 20%, shrinkage is a problem. Moreover, the heat of the reaction is such that warpage may occur. On the other hand, if too little is used, e.g., less than 10%, the mold is brittle and has low compressive strength. Among the binders that can be used are the thermosetting resins including catalyzed setting resins, which may be modified with thermoplastic resins, elastomers, plasticizers, and combinations thereof.

Ordinarily, the thermosetting resins such as the epoxy, polyurethane and phenolic resins are more suitable as they cure and/or set with time. However, if resistance to impact, bending and/or peeling forces is desired, it may be advantageous to add a thermoplastic resin, such as polyvinyl esters, e.g., polyvinyl acetate, acrylic resins, etc., elastomeric materials and/or plasticizers such as di-2-hexylethyl phthalate to the thermosetting resin. The function of the thermoplastic and/or elastomeric addition to the thermosetting resin is plasticization resulting in increased flexibility due to suppression of cross-linkages during the curing operation. Advantageously, the binder is a polymerized epoxy resin since it has high strength, requires less heat control and is very resistant to abrasion. In general, the hardener used with the epoxies of the mold composition are present in amounts of 10% to 25% by weight of the epoxy reactants.

The amounts of filler and lightweight aggregate can be varied within the ranges heretofore set forth in order to obtain the proper balance of strength and weight. For example, where high strength is a necessity, the amount of filler is increased. However, if it is increased beyond 60%, the mold tends to be brittle. If light weight is the requirement, then the filler can be eliminated from the composition entirely.

Advantageously, the filler is a material selected from the group consisting of marble dust, fuller's earth, calcium carbonate (lime or limestone) and combinations thereof.

The lightweight aggregate, which is an expanded material, is advantageously an aggregate selected from the group consisting of expanded shale, clay, pumice and combinations thereof. More advantageously, the lightweight aggregate is an unbroken, expanded material which has been sealed by heating or tumbling so that it is substantially impervious to moisture and/or absorption. In order to obtain proper distribution and better strength, the particle size of the lightweight aggregate should also be controlled. Thus, it is advantageous to utilize an aggregate having a particle size of less than one inch provided that at least 80% of the aggregate has a particle size of greater than 0.25 inch.

In carrying the invention into practice the concrete-forming molds are generally made by first preparing a positive in the customary manner exercising care so that all dimensions are within acceptable tolerances. The positive is preferably made of gypsum although wood, treated paper, fabric and plastics may also be used as those skilled in the art will readily understand.

The positive, as is depicted in FIGURES 1 and 2 of the drawing, is placed on a supporting base or work table 10 advantageously having vertical retaining walls 12 which are parallelly oppositely disposed. The retaining walls 12 provide some measure of support for the positive 14 particularly when the mold 16 is being formed. In addition, they can even be employed as a pattern surface in the preparation of the mold.

The positive 14 is then provided with a conventional parting or releasing agent 18. Among the parting compounds found suitable in the practice of this invention are carnauba waxes, fluorocarbon dispersions, silicon waxes and many other materials as those skilled in the art will readily appreciate. Advantageously, the parting agent is applied to the positive and the interior surfaces of the retaining walls 12 by spraying although it can be coated thereon by any other commonly available means, e.g., by brushing.

The next steps involve the preparation of the mold 16 which is formed upside down with its concrete-contacting top surface adjacent to the positive 14 and separated therefrom by the parting compound coating 18. The concrete contacting top surface 20 of the mold 16 is advantageously compounded into a gel-coat from an unpolymerized epoxy resin and a hardener in a weight ratio of between 5 and 7 parts of epoxy resin to 1 part of hardener, e.g., 6:1. While the gel-coat is still fluid, it is evenly applied, e.g., by spraying, to the coated positive to a thickness of between 10 and 50 mils, e.g., 25 mils. In the case of large molds or molds for intricate shapes or those requiring long life, the gel-coat is advantageously backed with fiber glass by placing it on the gel-coat before it sets, taking care to avoid pressuring the fiber glass through the gel-coat and into contact with the parting compound. Advantageously, the fiber-glass backing is a plain weave cloth of 4 ounce fiber glass which has been Volan-treated, although other kinds and weights of fiber glass may be used. The fiber glass is then coated with additional epoxy resin and hardener in the amounts hereinbefore set forth.

Once the epoxies of the gel-coat and the backing have partially set, but before they have fully set, the mold core composition 21 is poured thereon. Advantageously, the mold core composition contains, by weight, 12.5% of a binder, 50% of filler material having an average particle screen size of between 80 and 200 mesh and 37.5% of expanded lightweight aggregate having a particle size of between 0.25" and 1". If a very lightweight mold is desired the filler is excluded from the composition. A suitable composition for such a mold comprises 15% of binder and the balance lightweight aggregate.

The filler-containing mold core composition is prepared by thoroughly mixing the binder with the filler material before the binder has fully set. If increased fluidity is desired, the amount of filler is decreased and/or a thinner, e.g., a styrene monomer, is added in amounts of about 5% of the weight of the binder. If decreased flow is desired, the amount of filler material is increased.

The resulting binder-filler mixture is then blended with the lightweight aggregate to form a mold core composition. This composition is cured for at least 8 hours, e.g., overnight, and is removed from the positive by lifting. Before using as a mold, it is advisable to remove any irregularities in the surface 20 by light sanding. However, molds made in the foregoing manner require a minimum of finishing operations.

For the purpose of giving those skilled in the art a better appreciation of the advantages of the invention, the following illustrative examples are given:

EXAMPLE I

A mold was made in the manner hereinbefore set forth. A gel-coat 25 mils thick was made from an epoxy resin and a hardener in a weight ratio of 6.5:1. The core composition consisted of, by weight, a binder containing 8.6 parts of epoxy and 1.3 parts of hardener, 42.8 parts of calcium carbonate having an average particle size of between 80 and 200 mesh and 33.5 parts of coated, unbroken, expanded clay having a particle size running from 5/16" to 0.5" and weighing 40 lbs./cu. ft. It was found that this mold had a weight of only 86 lbs./cu. ft. and a compressive strength of 3200 pounds per square inch (p.s.i.).

EXAMPLE II

Like Example I, a mold was prepared in the manner hereinbefore set forth and the gel-coat was again 25 mils thick. However, in this example, no filler material was used. The mold composition contained, by weight, 6 parts of an epoxy resin binder of which 0.9 part was hardener. The remainder of the composition was 34.8 parts of a lightweight aggregate similar in all respects to the aggregate used in Example I. This mold weighed only 40.8 lbs./cu. ft. and had a compressive strength of 800 p.s.i. despite the fact that it had no filler material incorporated therein and that the contact between the ingredients was substantially point-to-point.

The foregoing elements and ingredients constitute the basic parts making up the mold and the mold core composition. Other elements or components can be added or elements can be altered to meet a particular need for a particular situation. For example as shown in FIGURE 1, parallel space fillers 22 may be used to save the expense of epoxy resin and to reduce the weight of the mold in those situations where maximum strength is not a necessity. The space fillers 22 are advantageously tubular articles made out of resin-impregnated paper, stiffened cloth, styrofoam, urethane or any other compatible lightweight material in any form or shape. In addition, the molds can be provided with levelling rails 24, which may be made of any structural material, e.g., wood, steel, etc. The rails 24, which are anchored into the mold core composition by fasteners 26, provide a level base for the mold and lessen the chances of damaging the mold particularly during handling and when placed on a vibrating or shocking table.

The lightweight composite mold provided by the present invention is particularly adapted for utilization in the forming of concrete articles and components for the building and construction industries. Thus, it can be employed to advantage in the forming of structural elements such as window and door frames, wall panels, floors, arches and other concrete load-bearing elements. In addition, it can even be employed in the preparation of concrete articles having an aesthetic or decorative appeal.

Although the present invention has been described in conjunction with preferred embodiments, it is to be understood that modifications and variations may be restored to without departing from the spirit and scope of the present invention, as those skilled in the art readily understand. Such modifications and variations are considered to be within the purview and scope of the invention and the appended claims.

I claim:

1. A mold for the forming of concrete articles comprising a thin, smooth, substantially water-impervious concrete-receiving gel-coat made of a polymerized plastic compound selected from the group consisting of epoxy and polyester resins containing a hardener bonded to a massive mold core portion containing by weight 10% to 20% of a thermosetting resin binder containing a hardener, up to 60% of filler material compatible with the ingredients of the mold core composition and gel coat and having an average particle size of between 80 and 200 mesh, and the balance being an expanded lightweight aggregate weighing between 20 and 60 pounds per cubic foot, at least 80% of the aggregate having a particle size greater than .25 inch but less than 1 inch, said aggregate being present in amounts of at least 25% but not more than 90% by weight of the mold composition.

2. A mold for the forming of concrete articles as claimed in claim 1 wherein the mold core is composed of at least two bonded layers, one of said layers being made of a composition containing, by weight, 10% to 20% of a thermosetting resin binder with a hardener, 30% to 60% of said filler material and the balance being said lightweight aggregate and being present in amounts of at least 25% but not more than 60% by weight of the mold composition and another of said layers being made of a composition containing, by weight, 10% to 20% of a thermosetting binder with a hardener with the balance being said lightweight aggregate.

3. A mold for the forming of concrete articles as claimed in claim 1 wherein the filler material is selected from the group consisting of marble dust, fuller's earth, calcium carbonate and combinations thereof and wherein the expanded lightweight aggregate is selected from the group consisting of expanded shale, clay, pumice and combinations thereof.

4. A mold for the forming of concrete articles as claimed in claim 3 wherein the gel-coat is provided with a fiber glass reinforcement embedded therein.

5. A mold for the forming of concrete articles as claimed in claim 3 wherein the filler is present in amounts of between 30% and 60% and wherein the expanded lightweight aggregate is present in amounts of at least 25% but not more than 60% by weight of the mold composition.

6. A mold for the forming of concrete articles as claimed in claim 5 wherein the gel coat is provided with a fiber glass reinforcement embedded therein and wherein the filler is calcium carbonate.

7. A mold for the forming of concrete articles as claimed in claim 6 wherein the expanded lightweight aggregate is expanded clay.

8. A mold for the forming of concrete articles as claimed in claim 7 wherein the gel coat is made from an epoxy resin with a hardener and wherein the binder is an epoxy resin with a hardener.

References Cited

UNITED STATES PATENTS

| 3,097,080 | 7/1963 | Weir | 264—255 |
| 3,295,818 | 1/1967 | Kreier | 249—134 |

ROBERT F. BURNETT, Primary Examiner

WILLIAM J. VAN BALEN, Assistant Examiner

U.S. Cl. X.R.

106—38.25; 117—5.1; 161—162, 164; 249—134; 264—225, 337, 338